United States Patent
Weiss et al.

(10) Patent No.: US 9,045,701 B2
(45) Date of Patent: Jun. 2, 2015

(54) METHOD OF HYDROTREATING FEEDS FROM RENEWABLE SOURCES WITH INDIRECT HEATING

(75) Inventors: Wilfried Weiss, Lyons (FR); Laurent Bournay, Chaussan (FR); Thierry Chapus, Lyons (FR)

(73) Assignee: IFP Energies Nouvelles, Rueil-Malmaison Cedex (FR)

(*) Notice: Subject to any disclaimer, the term of this patent is extended or adjusted under 35 U.S.C. 154(b) by 174 days.

(21) Appl. No.: 12/912,214

(22) Filed: Oct. 26, 2010

(65) Prior Publication Data

US 2011/0094148 A1 Apr. 28, 2011

(30) Foreign Application Priority Data

Oct. 27, 2009 (FR) ..................................... 09 05161

(51) Int. Cl.
*C10G 65/02* (2006.01)
*C10G 3/00* (2006.01)
*C10G 65/04* (2006.01)

(52) U.S. Cl.
CPC *C10G 3/48* (2013.01); *C10G 65/04* (2013.01); *C10G 3/46* (2013.01); *C10G 3/50* (2013.01);
(Continued)

(58) Field of Classification Search
CPC .............. C10G 3/00; C10G 3/42; C10G 3/50; C10G 45/00; C10G 45/02; C10G 45/32; C10G 65/00; C10G 65/02; C10G 65/12; C10G 2300/1011; C10G 2300/1014; C10G 2300/1018; C07C 5/00; C07C 5/02; C07C 5/03; C07C 5/05
USPC ......... 585/240–242, 253, 312–314, 733, 250, 585/263, 265; 208/142–145
See application file for complete search history.

(56) References Cited

U.S. PATENT DOCUMENTS

| 7,999,142 B2 * | 8/2011 | Kalnes et al. ................. 585/240 |
| 2009/0031617 A1 | 2/2009 | O'Rear |

(Continued)

FOREIGN PATENT DOCUMENTS

| EP | 1 741 768 A1 | 1/2007 |
| FR | 2 917 423 A1 | 12/2008 |

(Continued)

OTHER PUBLICATIONS

C. Bouchy, G. Hastoy, E. Guillon, J. A. Martens, "Fischer-Tropsch Waxes Upgrading via Hydrocracking and Selective Hydroisomerization," Mar. 2009, IFP, vol. 64 No. 1, pp. 103-105.*
(Continued)

*Primary Examiner* — In Suk Bullock
*Assistant Examiner* — Philip Louie
(74) *Attorney, Agent, or Firm* — Millen, White, Zelano & Branigan, P.C.

(57) ABSTRACT

The invention describes a method of treating feeds from renewable sources comprising:
a hydrotreatment stage a) comprising at least two catalytic zones in which the entry stream comprising said feed mixed with at least a part of a hydrotreated liquid effluent from stage b) is introduced into the first catalytic zone at a temperature comprised between 150 and 260° C., and the effluent from the first catalytic zone is then introduced, mixed with at least a part of a hydrotreated liquid effluent from stage b) and preheated, into the following catalytic zone or zones at a temperature comprised between 260 and 320° C.,
a stage b) of separation of the effluent from the hydrotreatment stage a) permitting the separation of a gaseous effluent and of a hydrotreated liquid effluent of which at least a part is recycled upstream from each catalytic zone of stage a).

15 Claims, 1 Drawing Sheet

(52) U.S. Cl.
CPC    *C10G 2300/1014* (2013.01); *C10G 2300/1018* (2013.01); *C10G 2300/4006* (2013.01); *C10G 2300/4081* (2013.01); *C10G 2400/04* (2013.01); *C10G 2300/4018* (2013.01); *C10G 2400/08* (2013.01)

(56) References Cited

U.S. PATENT DOCUMENTS

| | | | |
|---|---|---|---|
| 2009/0082603 A1 | 3/2009 | Kalnes et al. | |
| 2009/0163744 A1* | 6/2009 | Abhari et al. | 568/876 |
| 2009/0253948 A1 | 10/2009 | McCall et al. | |
| 2010/0076236 A1 | 3/2010 | Van Heuzen et al. | |
| 2011/0042267 A1* | 2/2011 | Hayasaka | 208/27 |

FOREIGN PATENT DOCUMENTS

| | | |
|---|---|---|
| WO | WO 2008/101945 A1 | 8/2008 |
| WO | WO 2009/015055 A2 | 1/2009 |

OTHER PUBLICATIONS

International Search Report for FR 0905161, Date of Completion Jun. 10, 2010, 3 pages.

Huber George W et al. "Synthesis of transportation fuels from biomass: Chemistry, catalysts, and engineering," Chemical Reviews, ACS, Washington, DC, US LNKD-DOI: 10.1021/CR068360D, vol. 106, No. 9, ISSN:N 0009-2665, XP002490759 pp. 4044-0498.

* cited by examiner

METHOD OF HYDROTREATING FEEDS FROM RENEWABLE SOURCES WITH INDIRECT HEATING

FIELD OF THE INVENTION

The international context of the years 2005-2010 is marked firstly by the rapid growth in the demand for fuels, in particular gas oil bases in the European Community, and then by the extent of the problems linked with global warming and the emission of greenhouse gases. The result is a desire to reduce energy dependency vis-à-vis raw materials of fossil origin and the reduction of emissions of $CO_2$. In this context, the search for new feeds from renewable sources that can easily be integrated into the traditional refining and fuel production process plays an increasingly important part.

For this reason, the integration into the refining process of new products of vegetable origin, from the conversion of lignocellulosic biomass or from the production of vegetable oils or animal fats, has attracted a great deal more interest in recent years due to the increase in the cost of fossil materials. Similarly, traditional biofuels (principally ethanol or methyl esters of vegetable oils) have come to be considered a genuine supplement to petroleum bases in fuel pools.

The strong demand for gas oil and kerosene fuels, coupled with the extent of the concerns associated with the environment, increases the interest in using feeds from renewable sources. Among these feeds, there may be cited for example vegetable oils (for use in food or not) or those from algae, animal fats or used frying oils, raw or pre-treated, as well as mixtures of such feeds.

These feeds essentially contain chemical structures of triglyceride type that a person skilled in the art also knows under the name fatty acid triesters as well as free fatty acids and the hydrocarbon chains which constitute these molecules are essentially linear and have a number of unsaturations per chain generally comprised between 0 and 3 but which can be higher in particular for oils from algae. Vegetable oils and other feeds of renewable origin also comprise various impurities and in particular compounds containing heteroatoms such as nitrogen, and elements such as Na, Ca, P, Mg.

The very high molecular weight (more than 600 g/mol) of the triglycerides and the high viscosity of the considered feeds mean that their use, direct or mixed in gas oils, poses problems for modern engines of HDI type (compatibility with very high-pressure injection pumps, problem of clogging of injectors, uncontrolled combustion, low yields, emissions of toxic non-burned residues). However, the hydrocarbon chains which constitute the triglycerides are essentially linear and their length (number of carbon atoms) is compatible with the hydrocarbons present in the gas oils. It is therefore necessary to convert these feeds in order to obtain a gas oil base of good quality and/or a kerosene cut meeting the specifications in force, after mixing or addition of additives known to a person skilled in the art. For diesel, the final fuel must conform to standard EN590, and for kerosene it must meet the specifications described in IATA (International Air Transport Association) Guidance Material for Aviation Turbine Fuel Specifications such as the standard ASTM D1655.

The hydrotreatment of vegetable oils uses complex reactions which are favoured by a hydrogenating catalytic system. These reactions comprise in particular:
  hydrogenation of unsaturations,
  deoxygenation according to two reaction pathways:
    hydrodeoxygenation: elimination of oxygen by consumption of hydrogen and leading to formation of water
    decarboxylation/decarbonylation: elimination of oxygen by formation of carbon monoxide and dioxide: CO and $CO_2$
  hydrodenitrogenation: elimination of nitrogen by formation of $NH_3$.

The hydrogenation of unsaturations (carbon-carbon double bonds) is strongly exothermic and the increase in temperature resulting from the release of heat of the saturation reactions of the double bonds permits thermal levels to be reached where the rates of the deoxygenation/decarbonylation reactions start to be significant. Hydrodeoxygenation and decarboxylation/decarbonylation are also exothermic reactions. Hydrodenitrogenation is a more difficult reaction, requiring more severe temperature conditions than hydrodeoxygenation and decarboxylation/decarbonylation. However, hydrodenitrogenation is generally necessary, as nitrogenous compounds are generally poisons of the hydroisomerization catalysts generally used downstream from a method of hydrotreating feeds from renewable sources. Thus, because of the strongly exothermic nature of the set of reactions used, control of the temperature of the reaction medium proves to be very important, as too high a level of the temperatures favours:
  the self-sustainment, even the runaway, of reactions due to the effect of thermal acceleration of kinetics,
  undesirable secondary reactions, such as for example polymerization, coking of the catalysts or also cracking reactions.

Patent application EP 1 741 768 describes a method comprising a stage of hydrotreatment of vegetable oil containing more than 5 wt. % of free fatty acids in which the hydrotreated product is recycled, as diluent of the fresh feed, so as to control the exothermic nature of the reactions and to operate at reduced temperature. The hydrotreatment stage operates at a temperature comprised between 200 and 400° C. and at a liquid recycle rate comprised between 5 and 30 in order to limit the formation of polymers which cause blockages in the preheating section and which reduce the activity and the life of the catalyst. This solution leads to an extra cost for equipment and utilities consumption, due to the surplus of hydraulic capacity brought about by the high liquid recycle rate. The hydrotreatment stage is then followed by a hydroisomerization stage in order to improve the low-temperature properties of the linear paraffins obtained. The hydrotreatment stage in which the feed is simultaneously deoxygenated and desulphidized is advantageously used in a reactor comprising at least one catalytic bed and the hydrotreated product is recycled and mixed with the fresh feed, at the same time, upstream from the first catalytic bed and in the form of cooling quench liquid, also mixed with the fresh feed and a stream of hydrogen upstream from every other catalytic bed. This principle permits operation at reduced temperature at the top of every other catalytic bed following the first.

The present invention provides an improvement of this principle, by proposing a hydrotreatment method scheme, permitting, through the use of a liquid recycle at the entrance to each catalytic zone, a very precise control of temperatures, an improved control of the exothermic nature and the different reactions taking place in the different catalytic zones.

One of the aims of the present invention is thus to control the progress and the exothermic nature of the reactions in the different reaction zones used, while still ensuring the supply of heat necessary for start-up and control of the different reactions and in particular the hydrodenitrogenation requiring operating conditions at specific temperatures.

Another aim of the present invention is to provide a method intended to convert feeds from renewable sources to n-paraffins by hydrotreatment under pressure of hydrogen, the n-paraffins thus obtained then being hydroisomerized in a dedicated downstream unit, so as to obtain a good compromise between the cetane characteristics and the low-temperature properties, in order to produce a high-quality base that can be incorporated in the gas oil pool as well as a kerosene cut that meets the specifications.

The present invention therefore relates to a hydrotreatment method scheme permitting simultaneously a precise control of the reaction temperatures used in the different catalytic zones and the indirect heating of the system, by using a liquid recycle at the entrance to each catalytic zone, while still ensuring the hydrodenitrogenation of the feeds described above.

More precisely, the invention relates to a method of treating feeds from renewable sources comprising:
a the hydrotreatment stage a) comprising at least two catalytic zones in which the entry stream comprising said feed mixed with at least a part of the hydrotreated liquid effluent from stage b) and a hydrogen-rich gas is introduced into the first catalytic zone at a temperature comprised between 150 and 260° C., and in which the effluent from the first catalytic zone is then introduced, mixed with at least a part of the hydrotreated liquid effluent from stage b), and preheated, in the following catalytic zone or zones at a temperature comprised between 260 and 320° C.,
a stage b) of separation of the effluent from the hydrotreatment stage a) permitting the separation of a gaseous effluent and a hydrotreated liquid effluent of which at least a part is recycled upstream from each catalytic zone of stage a).

DESCRIPTION OF THE INVENTION

The present invention relates to a method of treating feeds from renewable sources, for conversion into gas oil fuel bases.

The feeds from renewable sources used in the present invention are advantageously chosen from oils and fats of vegetable or animal origin, or from mixtures of such feeds, containing triglycerides and/or free fatty acids and/or esters. The vegetable oils can advantageously be raw or refined, totally or in part, and from the following plants: colza, sunflower, soya, palm, cabbage palm, olive, coconut, jatropha, this list not being limitative. Oils from algae or fish are also suitable. Animal fats are advantageously chosen from lard or fats composed of residues from the food industry or from the catering industry.

These feeds essentially contain chemical structures of triglycerides type that a person skilled in the art also knows by the names fatty acid triesters as well as free fatty acids. A fatty acid triester is thus composed of three chains of fatty acids. These chains of fatty acids in the form of triesters or in the form of free fatty acids each have a number of unsaturations per chain, also called number of carbon-carbon double bonds per chain, generally comprised between 0 and 3 but which can be higher in particular for oils from algae which can have 5 to 6 unsaturations per chain.

The molecules present in the feeds from renewable sources used in the present invention therefore have a number of unsaturations, expressed per molecule of triglyceride, advantageously comprised between 0 and 18. In these feeds, the degree of unsaturation, expressed in number of unsaturations per hydrocarbon fatty chain, is advantageously comprised between 0 and 6.

The feeds from renewable sources generally also contain various impurities and in particular heteroatoms such as nitrogen. The nitrogen contents of vegetable oils are generally comprised between 1 ppm and 100 ppm by weight approximately, according to their nature. They can amount to up to 1 wt. % of individual feeds.

The presence of unsaturations, i.e. of carbon-carbon double bonds, on the hydrocarbon chains constituting the free fatty acids as on those constituting the triglycerides makes said feed thermally unstable. Moreover, the hydrogenation of these unsaturations is strongly exothermic.

The treatment method according to the invention used must be both particularly flexible, in order to be able to process very different feeds in terms of unsaturations such as soya and palm oils for example or else oils of animal origin or from algae as defined above, and to permit the reaction of hydrogenation of the unsaturations to be started at as low as possible a temperature, avoiding heating in contact with a wall which would cause hot spots in said feed, which would lead to the formation of gums and cause fouling and an increase in the pressure drop of the catalyst bed or beds.

Stage a)

According to the method according to the invention, the entry stream comprising said feed mixed with at least a part of the hydrotreated liquid effluent from stage b) and a hydrogen-rich gas is introduced into the first catalytic zone at a temperature comprised between 150 and 260° C., preferably at a temperature comprised between 180 and 230° C., preferably comprised between 180 and 220° C., even more preferably comprised between 180 and 210° C., and even more preferably at a temperature equal to 200° C. according to the hydrotreatment stage a).

Before mixing with a part of the hydrotreated liquid effluent and optionally before mixing with a hydrogen-rich gas, the feed reaches ambient temperature or optionally a higher temperature, comprised between 50° C. and 150° C., by a preheating operation with an exchanger or a furnace at the moment when the temperature of the wall is low enough not to form gums.

At least a part of the hydrotreated liquid effluent from stage b) can advantageously be either cooled, or preheated, if necessary, or kept at the same temperature as at the exit from the separation stage b), before being recycled upstream from the first catalytic zone of the hydrotreatment stage a), according to the temperature and the flow rate of feed and hydrogen, such that the temperature of the entry stream, comprising said feed mixed with at least a part of said hydrotreated liquid effluent and a hydrogen-rich gas, is comprised between 180 and 230° C., preferably comprised between 180 and 220° C. and even more preferably comprised between 180 and 210° C. and even more preferably at a temperature equal to 200° C. In the case where at least a part of the hydrotreated liquid effluent from the separation stage b) is preheated before being recycled upstream from the first catalytic zone of the hydrotreatment stage a), said effluent optionally passes into at least one exchanger and/or at least one furnace before being recycled upstream from the first catalytic zone of the hydrotreatment stage a), so as to adjust the temperature of said hydrotreated and recycled liquid effluent.

In the case where at least a part of the hydrotreated liquid effluent from the separation stage b) is cooled before being recycled upstream from the first catalytic zone of the hydrotreatment stage a), said effluent optionally passes into at least one exchanger and/or at least one cooling tower before being recycled upstream from the first catalytic zone of the hydrotreatment stage a), so as to adjust the temperature of said hydrotreated and recycled liquid effluent.

The use of the recycling upstream from the first catalytic zone of at least a part of the hydrotreated and separated liquid effluent from stage b) which can be either cooled or preheated, if necessary, or kept at the same temperature as at the exit from the separation stage b), therefore permits the temperature of the stream entering said first catalytic zone to be adjusted as required. Thus, the increase in the temperature of the feed is caused by mixing with a hotter liquid, and not by contact with a heated wall. In the case where the hydrotreated liquid effluent is preheated, this permits the increased temperatures to be locally limited. In fact during a heating in a heat exchanger or in a furnace, to reach a given reference temperature T, the temperature on the hot side must necessarily be greater than T in order to carry out the heat transfer economically. It is well known to a person skilled in the art that the heat flow through a wall depends firstly on the difference in temperature on either side of said wall and on the exchange surface. A small difference in temperature between the cold side and the hot side will mean, for a given quantity of exchanged heat, a larger exchange surface. As a result, the temperature of the wall in contact with the cold fluid is higher than the desired temperature commonly called skin temperature. A heating by direct mixing with a hot fluid thus permits the skin temperature effect to be avoided and thus the zones of high temperature to be limited. This type of heating by mixing with an inert hot liquid therefore permits the undesirable reactions described above to be limited, and the temperature at which the stream enters the first catalytic zone of stage a) to be adjusted so as to start the reaction of hydrogenation of the unsaturations, preferably at as low as possible a temperature, while still controlling the exothermic nature of these reactions by a dilution effect of the reactive species.

The energy needed for the reaction and more precisely the adjustment of the minimum temperature necessary for the activation of the saturation reactions of the double bonds is therefore principally reached by mixing, upstream from a first catalytic zone, said feed from a renewable source and a hydrogen-rich gas, with a recycling of the hydrotreated liquid effluent from the separation stage b), having optionally undergone a temperature adjustment and preferably having been preheated or cooled.

According to the invention, a stream of hydrogen-rich gas is mixed with said fresh feed and/or with a part of the hydrotreated liquid effluent, preferably upstream from the first catalytic zone. The stream of hydrogen-rich gas can advantageously come from a supply of hydrogen and/or from the recycling of the gaseous effluent from the separation stage b), the gaseous effluent containing a hydrogen-rich gas having previously undergone one or more intermediate purification treatments before being recycled and mixed with the feed and/or with a part of the hydrotreated liquid effluent.

Upstream from the first catalytic zone, the hydrogen-rich gaseous stream can advantageously be heated or cooled, according to the case.

Thus, the stream of hydrogen-rich gas can advantageously be preheated or cooled, before mixing with a part of the hydrotreated liquid effluent and/or with the feed or after mixing with a part of said hydrotreated liquid effluent and/or with the feed, so as to adjust the entry temperature of the stream entering the first catalytic zone.

Thus, the temperature conditions used at the entrance to the first catalytic zone of stage a) of the method according to the invention permit the reaction of hydrogenation of the unsaturations to be started while still controlling the exothermic nature of these reactions, such that the variation in temperature between the entry stream, comprising said feed mixed with at least a part of the hydrotreated liquid effluent from stage b) and a hydrogen-rich gas, and the effluent leaving the first reaction zone is advantageously limited to between 50 to 60° C. Thus, the effluent leaves the first catalytic zone at a temperature advantageously comprised between 200 and 320° C., preferably comprised between 230 and 290° C., very preferably comprised between 230 and 280° C. and more preferably comprised between 230 and 270° C. and even more preferably the temperature does not exceed 260° C.

This principle thus permits operation at reduced temperature at the top of the first catalytic zone and therefore overall lowering of the average temperature level of the reaction zone, which favours the hydrogenolysis reactions and therefore the yield of gas oil and/or kerosene base.

The degree of hydrogenation of the unsaturations of the triglycerides of the feed at the exit from the first catalytic zone, i.e. the saturation of said feed thus obtained is monitored by measuring the iodine index according to standard NF ISO 3961. The degree of hydrogenation of the unsaturations of said feed is advantageously comprised between 70 and 80 mol % i.e. 80% of the number of unsaturations present in the initial feed are saturated.

The heat released by the saturation of the double bonds permits the raising of the temperature of the reaction medium and the starting of the deoxygenation reactions by the hydrodeoxygenation and decarboxylation/decarbonylation mechanisms in said first catalytic zone.

The degree of deoxygenation in molar percentage is monitored by measuring the oxygen concentration by elementary analysis.

In the first catalytic zone, the operating conditions used permit a degree of deoxygenation comprised between 30 and 50% and preferably between 35 and 40 mol % to be reached, i.e. that 30 to 50 mol % of the oxygen present is converted.

According to the invention, a the hydrotreatment stage a) comprises at least two catalytic zones and preferably stage a) comprises two catalytic zones.

The hydrotreatment catalyst used in the first catalytic zone of stage a) of the method according to the invention contains a hydro-dehydrogenating function comprising at least one group VIII metal and/or at least one group VIB metal and a support chosen from the group formed by alumina, silica, the silica-aluminas, magnesia, clays and mixtures of at least two of these minerals. Said support can also advantageously contain other compounds and for example oxides chosen from the group formed by boron oxide, zirconia, titanium oxide, phosphoric anhydride. The support is preferably constituted by alumina and very preferably by η, δ or γ alumina.

Preferably, said catalyst advantageously comprises at least one group VIII metal chosen from nickel and cobalt and at least one group VIB metal chosen from molybdenum and tungsten, alone or mixed.

Preferably, the group VIII element is nickel and the group VIB element is molybdenum and said catalyst has a nickel oxide content comprised between 0.5 wt. % and 10 wt. % and preferably between 1 wt. % and 5 wt. % and a molybdenum trioxide content comprised between 1 wt. % and 30 wt. % and preferably between 5 wt. % and 25 wt. %, on an amorphous mineral alumina support, the percentages being expressed in wt. % relative to the total weight of the catalyst.

Said catalyst used in the first catalytic zone of stage a) of the method according to the invention can also advantageously contain at least one doping element chosen from phosphorus and boron. This element can advantageously be introduced into the matrix or preferably be deposited on the support. Silicon can also advantageously be deposited on the support, alone or with phosphorus and/or boron and/or fluorine.

The oxide content by weight of said doping element is advantageously less than 20% and preferably less than 10% and is customarily advantageously at least 0.001%.

The metals of the catalysts used in the first catalytic zone of stage a) of the method according to the invention are advantageously sulphidized metals or metallic phases. In the case where the metals are sulphidized, the sulphidation methods are the standard methods, known to a person skilled in the art.

The reactions in the first catalytic zone are advantageously carried out at a pressure comprised between 1 MPa and 10 MPa, preferably between 3 MPa and 10 MPa and even more preferably between 3 MPa and 6 MPa, at an hourly space velocity comprised between 0.1 $h^{-1}$ and 10 $h^{-1}$ and preferably between 0.2 and 5 $h^{-1}$. The stream entering the first catalytic zone, comprising said feed mixed with at least a part of a hydrotreated liquid effluent from stage b) and a hydrogen-rich gas, is brought into contact with the catalyst in the presence of hydrogen. The quantity of hydrogen mixed with the feed or with the hydrotreated effluent or with the mixture of the two at the entrance to the first catalytic zone is such that the hydrogen/feed ratio is comprised between 200 and 2000 $Nm^3$ of hydrogen/$m^3$ of feed, preferably comprised between 200 and 1800 and very preferably between 500 and 1600 $Nm^3$ of hydrogen/$m^3$ of feed.

The feeds from renewable sources generally also contain various impurities and in particular heteroatoms such as nitrogen. The nitrogen contents encountered are comprised between 1 and 100 ppm by weight for vegetable oils, but can reach 1 wt. % in particular in feeds such as certain animal fats.

However, nitrogen is a poison of the hydroisomerization catalysts optionally used downstream from the treatment method according to the invention with the aim of obtaining a gas oil base of good quality and/or a kerosene cut conforming to the specifications.

One way of removing the nitrogen is to carry out a hydrodenitrogenation reaction in order to convert the nitrogen-containing molecules to ammonia that can be easily eliminated.

The temperature level reached after the saturation of the double bonds and the deoxygenation, which was deliberately limited as stated above, is not sufficient to permit hydrodenitrogenation.

Moreover, hydrodenitrogenation is a reaction characterized by relatively slow kinetics, which necessitates high temperature levels in order to achieve a quasi-total conversion, for reasonable residence times, and therefore more severe conditions than the reactions of hydrodeoxygenation and decarboxylation/decarbonylation.

According to the invention, the temperature level necessary for hydrodenitrogenation is provided by injecting at least a part of the hydrotreated liquid effluent, preheated beforehand, preferably through at least one exchanger and/or through at least one furnace or any other heating method known to a person skilled in the art such as for example microwaves, in the catalytic zone or zones following the first.

According to the method according to the invention, the effluent from the first catalytic zone is then introduced, mixed with at least a part of the hydrotreated liquid effluent from stage b), said liquid effluent being preheated beforehand, into the following catalytic zone or zones and preferably into the following catalytic zone called second catalytic zone, at a temperature comprised between 260 and 320° C., preferably at a temperature comprised between 280 and 320° C. and even more preferably at a temperature greater than 300° C., according to the hydrotreatment stage a).

At least a part of the hydrotreated liquid effluent from stage b) is therefore preheated beforehand by optional passage through at least one exchanger and/or at least one furnace or any other heating means known to a person skilled in the art, before being recycled upstream from each catalytic zone of the hydrotreatment stage a) following the first catalytic zone. This makes it possible to adjust the temperature of said hydrotreated and recycled liquid effluent and to bring about the mixture constituted by the effluent from the first catalytic zone with at least a part of said hydrotreated liquid effluent at temperature conditions favouring the hydrodenitrogenation reaction.

The recycling of at least a part of the hydrotreated liquid effluent, preheated beforehand, upstream from each catalytic zone of the hydrotreatment stage a) following the first catalytic zone therefore permits the indirect heating of the effluent from the first catalytic zone and the adjustment of the temperature at the entrance to the following catalytic zones at a temperature comprised between 260 and 320° C., so as to have temperature conditions favouring the hydrodenitrogenation reaction and carry out the deoxygenation of the partially deoxygenated effluent.

Another heating stream is advantageously constituted by a hydrogen-rich gaseous effluent from the hydrogen supply and/or the gaseous effluent from the separation stage b). At least a part of this hydrogen-rich gaseous effluent from the hydrogen supply and/or the gaseous effluent from the separation stage b) is advantageously injected mixed with at least a part of the hydrotreated liquid effluent from stage b) or separately, upstream from each catalytic zone of stage a) following the first catalytic zone and preferably upstream from the second catalytic zone. The hydrogen-rich gaseous stream can therefore advantageously be preheated mixed with at least a part of the hydrotreated liquid effluent or preheated separately before mixing preferably by optional passage through at least one exchanger and/or at least one furnace or any other heating means known to a person skilled in the art.

Thanks to the different heating streams, the temperature conditions used in the catalytic zones following the first and preferably in the second catalytic zone are more favourable to the hydrodenitrogenation kinetics than the temperature conditions used in the first catalytic zone and also permit a majority of the deoxygenation reactions to be carried out.

The degree of deoxygenation is monitored by measuring the oxygen concentration by elementary analysis.

In the catalytic zone or zones following the first catalytic zone and preferably in the second catalytic zone, the operating conditions used permit a local degree of deoxygenation greater than 60% and preferably greater than 90% to be achieved, i.e. an overall rate of deoxygenation over all the first and subsequent zones comprised between 80 and 100% and preferably between 95 and 100%. In addition, the operating conditions used also permit a nitrogen content of the hydrotreated effluent of less than 5 ppm, preferably less than 2 ppm and very preferably, less than 1 ppm to be achieved at the end of the catalytic zone or zones following the first catalytic zone and preferably the second catalytic zone, the nitrogen content being measured according to the standard ASTM D4629-2002.

The hydrotreatment catalyst used in the catalytic zone or zones following the first catalytic zone of stage a) of the method according to the invention and preferably the second catalytic zone, is advantageously identical to or different from that used in the first catalytic zone of stage a).

A preferred catalyst advantageously contains a hydro-dehydrogenating function comprising at least one group VIII metal and/or at least one group VIB metal and a support chosen from the group formed by alumina, silica, the silica-aluminas, magnesia, clays and mixtures of at least two of these minerals. Said support can also advantageously contain other compounds and for example oxides chosen from the group formed by boron oxide, zirconia, titanium oxide, phosphoric anhydride. Preferably, the support is constituted by alumina and very preferably by η, δ or γ alumina.

Preferably, said catalyst advantageously comprises at least one group VIII metal chosen from nickel and cobalt and at least one group VIB metal chosen from molybdenum and tungsten, alone or mixed.

Preferably, the group VIII element is nickel and the group VIB element is molybdenum and said catalyst comprises a nickel oxide content comprised between 0.5 wt. % and 10 wt. % and preferably between 1 wt. % and 5 wt. % and a molybdenum trioxide content comprised between 1 wt. % and 30 wt. % and preferably between 5 wt. % and 25 wt. %, on an amorphous mineral alumina support, the percentages being expressed in wt. % relative to the total weight of the catalyst.

Said catalyst used in the first catalytic zone of stage a) of the method according to the invention can also advantageously contain at least one doping element chosen from phosphorus and boron. This element can advantageously be introduced into the matrix or preferably deposited on the support. Silicon can also advantageously be deposited on the support, alone or with phosphorus and/or boron and/or fluorine.

The oxide content by weight of said doping element is advantageously less than 20% and preferably less than 10% and it is usually advantageously at least 0.001%.

The metals of the catalysts used in the first catalytic zone of stage a) of the method according to the invention are advantageously sulphidized metals or metallic phases.

The reactions in the catalytic zone or zones following the first catalytic zone are advantageously carried out at a pressure comprised between 1 MPa and 10 MPa, preferably between 3 MPa and 10 MPa and even more preferably between 3 MPa and 6 MPa, at an hourly space velocity comprised between $0.1\ h^{-1}$ and $10\ h^{-1}$ and preferably between 0.2 and $5\ h^{-1}$. The total quantity of hydrogen mixed at the entrance to the second catalytic zone with the effluent from the first zone or with the part of the hydrotreated liquid effluent or with the mixture of the two is such that the hydrogen/hydrocarbons ratio entering the catalytic zone or zones following the first is comprised between 200 and 2000 $Nm^3$ of hydrogen/$m^3$ of feed, preferably comprised between 200 and 1800 and very preferably between 500 and 1600 $Nm^3$ of hydrogen/$m^3$ of feed. To achieve these conditions a stream of hydrogen-rich gas is advantageously mixed with the stream upstream from the second catalytic zone. The stream of hydrogen-rich gas can advantageously come from a hydrogen supply and/or the recycling of the gaseous effluent from the separation stage b), the gaseous effluent containing a hydrogen-rich gas having previously undergone one or more intermediate purification treatments before being recycled and mixed.

Moreover, the minimization of the streams at the entrance to the catalytic zone or zones following the first limits the dilution of the nitrogen-containing compounds. The minimization of the liquid recycling therefore favours the hydrodenitrogenation kinetics, since these are a function of the concentration of nitrogen-containing compounds. It is therefore beneficial to minimize the hydrotreated liquid recycle.

The overall recycle rate of the method according to the invention is defined by the ratio of the mass flow rate of total recycled hydrotreated product in kilograms to the mass flow rate of fresh feed in kilograms.

The overall recycle rate of the method according to the invention is advantageously comprised between 0.5 and 5 and preferably between 0.5 and 4, preferably between 0.5 and 3, very preferably greater than 0.5 and strictly less than 3 and still more preferably strictly less than 3.

The use of low overall recycle rates is permitted due to an advantageous use of the heats of reaction, combined with as low as possible a temperature at the entrance to each catalytic zone. The minimization of the hydraulic flow rate in the first catalytic zone leads to significantly reduced investment costs and operating costs.

Moreover, the minimization of the recycle rate in the unit, leading to a smaller dilution of the nitrogen-containing compounds, combined with a high temperature permitted due to the supply of a hot stream at the entrance to the second catalytic zone, leads to higher hydrodenitrogenation kinetics and therefore permits an optimized quantity of catalyst.

The control of the temperature and the rate of recycling of hot or very hot liquid at the entrance to each catalytic zone ensures the flexibility of the method by supplying the heat necessary to start up the reactions while still controlling the increase in temperature. In fact, a part of the energy released by the reactions carried out will serve to heat both the feed and the recycle. The result is a smaller increase in temperature. The control of the increase in temperature of the reaction medium permits the kinetics of the reactions, themselves exothermic, to be influenced. This permits the risks of runaway to be limited for an operation in complete safety and permits the desired conversion to be achieved in each catalytic zone.

Preferably, the different catalytic zones of the hydrotreatment stage a) are situated in one or more reactors and preferably in a single reactor.

In the case where they are situated in a single reactor, the different catalytic zones are constituted by several catalytic beds, optionally separated by liquid or gaseous quench zones.

Preferably, stage a) comprises two catalytic zones situated in one or in two reactors. The first catalytic zone is advantageously a hydrogenation zone in which the majority of the double bonds are hydrogenated and the heat released by the hydrogenation reaction is advantageously used to start the deoxygenation reactions and the second catalytic zone is advantageously a deoxygenation (decarboxylation and hydrodeoxygenation) and hydrodenitrogenation zone in which the majority of the deoxygenation and hydrodenitrogenation reactions take place.

Stage b)

According to stage b) of the method according to the invention, the effluent from the hydrotreatment stage a) undergoes a stage permitting the separation of a gaseous effluent and a hydrotreated liquid effluent of which at least a part is recycled upstream from each catalytic zone of stage a).

The gaseous effluent contains mostly hydrogen, carbon monoxide and dioxide, light hydrocarbons with 1 to 5 carbon atoms and water vapour. The aim of this stage is therefore to separate the gases from the liquid, and in particular to recover the hydrogen-rich gases and at least one hydrotreated liquid effluent preferably having a nitrogen content of less than 1 ppm by weight.

At least a part of the hydrogen-rich gaseous effluent from the separation stage b) which has preferably undergone a purification treatment with the aim of deconcentrating the impurities from the reactions present in the gaseous effluent at the moment of the separation stage b) can advantageously be injected either mixed with at least a part of the hydrotreated liquid effluent from stage b) or separately, upstream from each catalytic zone of stage a).

The separation stage can advantageously be implemented by any method known to a person skilled in the art such as for example the combination of one or more high- and/or low-pressure separators, and/or distillation and/or high- and/or low-pressure stripping stages.

The hydrotreated liquid effluent is essentially constituted by n-paraffins which can be incorporated in the gas oil pool and/or the kerosene pool. So as to improve the low-temperature properties of this hydrotreated liquid effluent, a hydroisomerization stage is necessary to convert the n-paraffins into branched paraffins having better low-temperature properties.

At least a part, and preferably all, of the non-recycled hydrotreated liquid effluent then undergoes an optional hydroisomerization stage in the presence of a selective hydroisomerization catalyst.

The hydroisomerization stage is advantageously carried out in a separate reactor. The hydroisomerization catalysts used are advantageously of bifunctional types, i.e. they have a hydro/dehydrogenating function and a hydroisomerizing function.

The hydroisomerization catalyst advantageously comprises at least one group VIII metal and/or at least one group VIB metal as hydrodehydrogenating function and at least one molecular sieve or an amorphous mineral support as hydroisomerizing function.

The hydroisomerization catalyst advantageously comprises either at least one group VIII precious metal preferably chosen from platinum or palladium, active in their reduced form, or at least one group VIB metal, preferably chosen from molybdenum or tungsten, in combination with at least one group VIII base metal, preferably chosen from nickel and cobalt, used preferably in their sulphidized form.

In the case where the hydroisomerization catalyst comprises at least one group VIII precious metal, the total precious metal content of the hydroisomerization catalyst used in stage c) of the method according to the invention is advantageously comprised between 0.01 wt. % and 5 wt. % relative to the finished catalyst, preferably between 0.1 wt. % and 4 wt. % and very preferably between 0.2 wt. % and 2 wt. %.

Preferably, the hydroisomerization catalyst comprises platinum or palladium and preferably the hydroisomerization catalyst comprises platinum.

In the case where the hydroisomerization catalyst comprises at least one group VIB metal in combination with at least one group VIII base metal, the group VIB metal content of the hydroisomerization catalyst used in stage c) of the method according to the invention is advantageously comprised, in oxide equivalent, between 5 wt. % and 40 wt. % relative to the finished catalyst, preferably between 10 wt. % and 35 wt. % and very preferably between 15 and 30 wt. % and the group VIII metal content of said catalyst is advantageously comprised, in oxide equivalent, between 0.5 wt. % and 10 wt. % relative to the finished catalyst, preferably between 1 wt. % and 8 wt. % and very preferably between 1.5 wt. % and 6 wt. %, The metallic hydro/dehydrogenating function can advantageously be introduced on said catalyst by any method known to a person skilled in the art, such as for example comixing, dry impregnation, exchange impregnation.

According to a preferred embodiment, said hydroisomerization catalyst comprises at least one amorphous mineral support as hydroisomerizing function, said one amorphous mineral support being chosen from the silica-aluminas and silicated aluminas and preferably the silica-aluminas.

A preferred hydroisomerization catalyst comprises an active phase based on nickel and tungsten and an amorphous silica-alumina mineral support, said catalyst being preferably in sulphide form.

According to another preferred embodiment, said hydroisomerization catalyst comprises at least one molecular sieve, preferably at least one zeolite molecular sieve and more preferably at least one 10 MR one-dimensional zeolite molecular sieve as hydroisomerizing function.

Zeolite molecular sieves are defined in the classification "Atlas of Zeolite Structure Types", W. M Meier, D. H. Olson and Ch. Baerlocher, 5th revised edition, 2001, Elsevier to which the present application also refers. The y-zeolites are classified there according to the size of their pore or channel openings.

10 MR one-dimensional zeolite molecular sieves have pores or channels of which the opening is defined by a ring with 10 oxygen atoms (10 MR opening). The channels of the zeolite molecular sieve having a 10 MR opening are advantageously non-interconnected one-dimensional channels which open directly onto the outside of said zeolite. The 10 MR one-dimensional zeolite molecular sieves present in said hydroisomerization catalyst advantageously comprise silicon and at least one element T chosen from the group formed by aluminium, iron, gallium, phosphorus and boron, preferably aluminium. The Si/Al ratios of the zeolites described above are advantageously those obtained during synthesis or obtained after post-synthesis dealuminating treatments well known to a person skilled in the art, such as and non-limitatively hydrothermal treatments followed or not by acid attacks or also direct acid attacks by solutions of mineral or organic acids. Preferably, they are practically totally, in acid form, i.e. the atomic ratio between the monovalent compensation cation (for example sodium) and the element T inserted into the crystal lattice of the solid is advantageously less than 0.1, preferably less than 0.05 and very preferably less than 0.01. Thus, the zeolites included in the composition of said selective hydroisomerization catalyst are advantageously calcined and exchanged by at least one treatment with a solution of at least one ammonium salt so as to obtain the ammonium form of the zeolites which once calcined lead to the acid form of said zeolites.

Said 10 MR one-dimensional zeolite molecular sieve of said hydroisomerization catalyst is advantageously chosen from the zeolite molecular sieves of structural type TON, such as NU-10, FER, such as ferrierite, EUO, chosen from EU-1 and ZSM-50, used alone or mixed, or the zeolite molecular sieves ZSM-48, ZBM-30, IZM-1, COK-7, EU-2 and EU-11, used alone or mixed.

Preferably, said 10 MR one-dimensional zeolite molecular sieve is chosen from the ZSM-48, ZBM-30, IZM-1 and COK-7, zeolite molecular sieves, used alone or mixed. Even more preferably, said 10 MR one-dimensional zeolite molecular sieve is chosen from the zeolite molecular sieves ZSM-48 and ZBM-30, used alone or mixed.

Very preferably, said 10 MR one-dimensional zeolite molecular sieve is ZBM-30 and even more preferably, said 10 MR one-dimensional zeolite molecular sieve is ZBM-30 synthesized with the organic structurizing agent triethylenetetramine.

Zeolite ZBM-30 is described in patent EP-A-46 504, and zeolite COK-7 is described in patent applications EP 1 702 888 A1 or FR 2 882 744 A1.

Zeolite IZM-1 is described in patent application FR-A-2 911 866 and zeolite ZSM 48 is described in Schlenker, J. L. Rohrbaugh, W. J., Chu, P., Valyocsik, E. W. and Kokotailo, G. T. Title: The framework topology of ZSM-48: a high silica zeolite Reference: Zeolites, 5, 355-358 (1985) Material "ZSM-48".

The zeolites of structural type TON are described in the work "Atlas of Zeolite Structure Types", W. M. Meier, D. H. Olson and Ch. Baerlocher, 5th Revised edition, 2001, Elsevier.

The zeolite of structural type TON is described in the work "Atlas of Zeolite Structure Types" cited above and, with respect to zeolite NU-10, in patents EP-65400 and EP-77624.

The zeolite of structural type FER is described in the work "Atlas of Zeolite Structure Types" cited above.

The content of 10 MR one-dimensional zeolite molecular sieve is advantageously comprised between 5 wt. % and 95 wt. %, preferably between 10 wt. % and 90 wt. %, more preferably between 15 wt. % and 85 wt. % and very preferably between 20 wt. % and 80 wt. % relative to the finished catalyst.

Preferably, said hydroisomerization catalyst also comprises a binder constituted by a porous mineral matrix. Said binder can advantageously be used during the stage of shaping said hydroisomerization catalyst.

Preferably, the shaping is carried out with a binder constituted by a matrix containing alumina, in all its forms known to a person skilled in the art, and very preferably with a matrix containing gamma alumina.

The hydroisomerization catalysts obtained are formed as grains of various shapes and sizes. They are generally used in the form of cylindrical extrudates or multilobed extrudates such as bilobed, trilobed, multilobed of straight or twisted shape, but can optionally be manufactured and used in the form of pulverized powders, tablets, rings, spheres, wheels. Techniques other than extrusion, such as tableting or particle coating, can advantageously be used.

In the case where the hydroisomerization catalyst contains at least one precious metal, the precious metal content of said hydroisomerization catalyst must advantageously be reduced. One of the preferred methods for carrying out the reduction of the metal is treatment under hydrogen at a temperature comprised between 150° C. and 650° C. and a total pressure comprised between 1 and 25 MPa. For example, a reduction consists of a plateau at 150° C. for two hours then a temperature rise to 450° C. at a rate of 1° C./min then a plateau of two hours at 450° C.; throughout this reduction stage, the hydrogen flow rate is 1000 normal m$^3$ hydrogen/m$^3$ catalyst with the total pressure maintained constant at 0.1 MPa. Any method of reduction ex-situ can advantageously be envisaged.

In the hydroisomerization zone, the feed is contacted, in the presence of hydrogen, with said hydroisomerization catalyst, at operating temperatures and pressures advantageously permitting hydroisomerization of the non-converting feed to be carried out. This means that the hydroisomerization is carried out with a conversion of the 150° C.$^+$ fraction to 150° C.$^-$ fraction of less than 20 wt. %, preferably less than 10 wt. % and very preferably less than wt. %.

Thus, the optional hydroisomerization stage operates at a temperature comprised between 150 and 500° C., preferably between 150° C. and 450° C., and very preferably between 200 and 450° C., at a pressure comprised between 1 MPa and 10 MPa, preferably between 2 MPa and MPa and very preferably between 1 MPa and 9 MPa, at an hourly space velocity advantageously comprised between 0.1 h$^{-1}$ and 10 h$^{-1}$, preferably between 0.2 and 7 h$^{-1}$ and very preferably between 0.5 and 5 h$^{-1}$, at a hydrogen flow rate such that the hydrogen/hydrocarbons volume ratio is advantageously comprised between 70 and 1000 Nm$^3$/m$^3$ of feed, between 100 and 1000 normal m$^3$ of hydrogen per m$^3$ of feed and preferably between 150 and 1000 normal m$^3$ of hydrogen per m$^3$ of feed.

Preferably, the optional hydroisomerization stage operates in co-current.

The hydroisomerized effluent is then advantageously subjected at least partly, and preferably wholly, to one or more separations. The aim of this stage is to separate the gases from the liquid, and in particular to recover the hydrogen-rich gases that may also contain light fractions such as the C$_1$-C$_4$ cut, at least one gas oil (250° C.+ cut) and kerosene (150-250° C. cut) cut of good quality and a naphtha cut. The use made of the naphtha cut is not the subject of the present invention, but this cut can advantageously be sent to a steam cracking or catalytic reforming unit.

The products, gas oil and kerosene bases, obtained according to the method according to the invention and in particular after hydroisomerization have excellent characteristics. The gas oil base obtained after mixing with a petroleum gas oil from a renewable feed such as coal or lignocellulosic biomass, and/or with an additive, is of excellent quality:

its sulphur content is less than 10 ppm by weight.
its total aromatics content is less than 5 wt. %, and the polyaromatics content less than 2 wt. %.
the cetane number is excellent, greater than 55.
the density is less than 840 kg/m$^3$, more often greater than 820 kg/m$^3$.
its kinematic viscosity at 40° C. is 2 to 8 mm$^2$/s.
its low-temperature stability properties are compatible with the standards in force, with a cold filter plugging point below −15° C. and a cloud point below −5° C.

The kerosene cut obtained after mixing with a petroleum kerosene from a renewable feed such as coal or lignocellulosic biomass and/or with an additive has the following characteristics:

a density comprised between 775 and 840 kg/m$^3$
a viscosity at −20° C. of less than 8 mm$^2$/s
a crystal disappearance point below −47° C.
a flash point above 38° C.
a smoke point above 25 mm.

Figure 1:
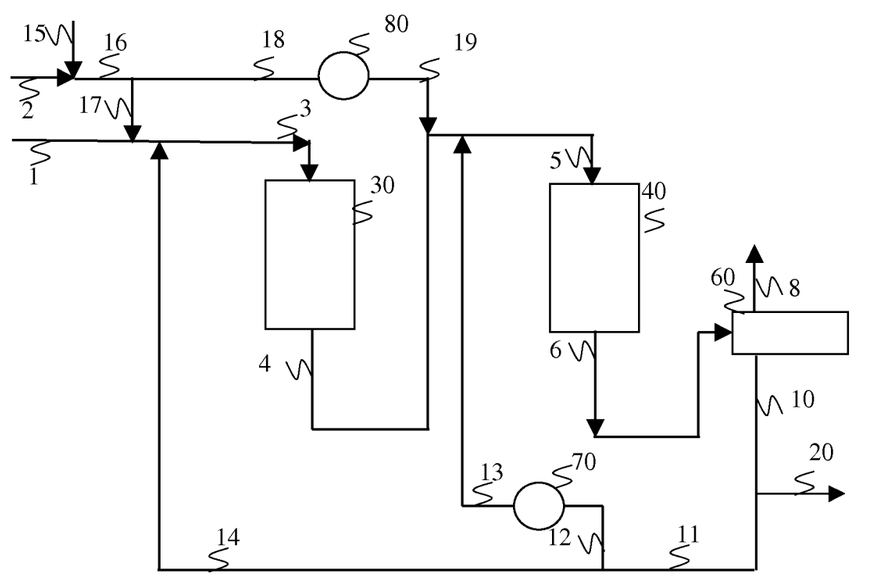
FIG. 1 illustrates a non-limitative preferred embodiment of the method according to the invention in which stage a) comprises two catalytic zones situated in two reactors.

The fresh feed (1) is introduced mixed with a part of the hydrotreated liquid effluent (14) from the separation zone (60) via the pipe (3). Hydrogen-rich gas is mixed via the pipe (17) with the fresh feed. The hydrogen-rich gas (17) comes from a hydrogen supply (2) and gaseous effluent from the separation zone (60) via the pipe (8), the gaseous effluent having previously undergone one or more intermediate purification treatments before being mixed with the fresh feed and recycled via the pipe (15).

Upstream from the first catalytic zone (30), the fresh feed, mixed with a hydrogen-rich gaseous stream, is also mixed via the pipe (14) with at least a part of the hydrotreated effluent from the separator (60) via the pipe (11) so as to obtain the sought temperature at the entrance to the first catalytic zone (30).

The effluent (4) from the first catalytic zone (30) is then mixed with a hydrogen-rich gas via the pipe (19) and at least a part of the hydrotreated liquid effluent via the pipe (13). The hydrogen-rich gas (19) is obtained by heating the stream (18) from a hydrogen source in a furnace (80). The hydrotreated effluent (13) is obtained by heating the stream (12) from the separator (60) in a furnace (70) in order to adjust the temperature of the mixture in the pipe (5) at the entrance to the second catalytic zone (40).

The effluent issued from the second catalytic zone (40) via the pipe (6) then undergoes a separation stage in the separator (60) in order to obtain a hydrotreated liquid effluent (10) and a gaseous effluent (8). The gaseous effluent (8) is a hydrogen-rich gas of which a part is treated before being recycled upstream from the two catalytic zones (30) and (40). The stream (10) is constituted for the most part by a hydrotreated product which is divided into two streams, the stream (11) which is recycled upstream from the two catalytic zones after having been optionally preheated or not and the stream (20) which is sent directly into a hydroisomerization unit not shown in FIG. 1.

The following example illustrates the invention without, however, limiting its scope.

EXAMPLE

Soya oil is constituted for the most part by triglycerides each molecule of which comprises on average approximately 4.7 double bonds. This FIGURE is an average of the number of unsaturations present per molecule of triglycerides and obtained from the typical fatty acids composition of the oil. This FIGURE is defined as the ratio between the total number of unsaturations and the number of molecules of triglycerides.

Palm oil is constituted for the most part by triglycerides each molecule of which comprises on average approximately 2.1 double bonds. This difference in the number of double bonds or unsaturations manifests itself in very different heats of reaction. These two oils constitute excellent examples for illustrating thermal flexibility of the method.

50 L/h of soya oil of density 920 kg/m$^3$ having a nitrogen content equal to 23 ppm by weight is introduced into a first adiabatic reactor, loaded with 31 L of a hydrotreatment catalyst constituting the first catalytic zone.

The principal characteristics of the soya oil and palm oil feeds used in the method according to the invention are listed in Table 1.

TABLE 1

|  | soya oil | palm oil |
|---|---|---|
| Properties of the feed Elementary analysis | | |
| S [ppm by wt] | 4 | 3 |
| N [ppm by wt] | 23 | 15 |
| P [ppm by wt] | 10 | 10 |
| H [wt. %] | 11.4 | 11.9 |
| O [wt. %] | 11.0 | 11.3 |
| Composition in fatty acids (%) | | |
| 12:0 | 0.10 | 0.25 |
| 14:0 | 0.10 | 1.07 |
| 16:0 | 10.28 | 44.21 |
| 16:1 |  | 0.15 |
| 17:1 |  |  |
| 18:0 | 3.73 | 4.45 |
| 18:1 | 22.98 | 39.89 |
| 18:2 | 54.13 | 9.62 |
| 18:3 | 8.67 | 0.37 |
| Hydrotreated effluent properties Elementary analysis | | |
| S [ppm by wt] | <0.3 | <0.3 |
| N [ppm by wt] | <0.4 | <0.4 |
| P [ppm by wt] | <1 | <1 |
| O [wt. %] | <0.2 | <0.2 |

The feed, initially at ambient temperature, is introduced into said first catalytic zone mixed with a part of the hydrotreated liquid effluent from the separation stage b), said effluent having an exit temperature of 317° C. for the soya oil and a temperature of 320° C. for the palm oil, and a hydrogen-rich gas, the mixture of hydrotreated effluent and hydrogen-rich gas being cooled beforehand in an exchanger at a temperature of 230° C. in the case of a soya oil feed and 260° C. in the case of a palm oil feed.

1000 Nm$^3$ of hydrogen/m$^3$ of feed are introduced into the first reactor mixed beforehand with the hydrotreated effluent. The flow rate of the hydrotreated effluent introduced into the first catalytic zone is equal to 125 L/h in the case of the soya oil and 50 L/h in the case of the palm oil.

Thus, the stream entering the first catalytic zone, constituted by said feed mixed with a part of the hydrotreated liquid effluent from stage b) and a hydrogen-rich gas, is introduced into said first catalytic zone at a temperature of 200° C. for the soya oil and for the palm oil.

The catalyst used in first catalytic zone of the hydrotreatment stage a) comprises 4 wt. % of NiO, 21 wt. % of MoO3 and 5 wt. % of P2O5 supported on a gamma alumina. Said catalyst has an Ni/Mo atomic ratio equal to 0.4.

The supported catalysts are prepared by dry impregnation of the oxide precursors in solution then sulphidized in-situ, at a temperature of 350° C., prior to the test using a direct-distillation gas oil feed with 2 wt. % dimethyldisulphide (DMDS) added. After sulphidation in situ in the pressurized unit, the feed from a renewable source constituted by soya oil or palm oil described in Table 1 is passed into the reactor.

In order to keep the catalyst in a sulphidized state, 50 ppm by weight of sulphur in the form of DMDS is added to the feed. In the reaction conditions, the DMDS is totally decomposed to form methane and H$_2$S.

The method of preparation of the catalysts does not limit the scope of the invention.

In the first catalytic zone, the pressure is kept at 5 MPa, the hourly space velocity is 1.6 h$^{-1}$ and the total quantity of hydrogen is such that the hydrogen/feed ratio is 1000 Nm$^3$/h/m$^3$.

The operating conditions and more particularly the temperature of the entering stream of 200° C. for the soya oil and for the palm oil, in the first catalytic zone permit the hydrogenation of the majority of the unsaturations of the feed at reduced temperature and the heat released by this reaction permits the starting of the feed deoxygenation reactions.

As the hydrogenation reactions are exothermic, the temperature at the exit of the effluent from the first catalytic zone is 260° C. in the case of the soya oil and 257° C. in the case of the palm oil.

The degrees of hydrogenation of the unsaturations and the degree of deoxygenation of the different feeds in the first catalytic zone of the hydrotreatment stage a) are given in Table 1.

The effluent from the first catalytic zone is then sent into a second catalytic zone situated in a second reactor loaded with 50 L of a hydrotreatment catalyst, mixed with hydrotreated effluent from the separation stage and hydrogen. 500 Nm$^3$ of hydrogen/m$^3$ of feed are introduced into the second reactor mixed beforehand with the hydrotreated effluent. The flow rate of the hydrotreated effluent introduced into the second catalytic zone is equal to 22.5 L/h in the case of the soya oil and 12.5 L/h in the case of the palm oil.

The mixture of hydrotreated effluent and hydrogen going to the second catalytic zone is preheated beforehand in a furnace at a temperature of 427° C. in the case of the soya oil and 430° C. in the case of the palm oil.

The temperature of the stream entering the second catalytic zone, constituted by the effluent from the first catalytic zone and the mixture of hydrotreated effluent and hydrogen, is therefore adjusted to 292° C. in the case of the palm oil and 292° C. in the case of the soya oil.

The catalyst used in the second catalytic zone is of the same nature as the one used in the first zone, comprising 4 wt. % of NiO, 21 wt. % of $MoO_3$ and 5 wt. % of $P_2O_5$ supported on a gamma alumina. Said catalyst has an Ni/Mo atomic ratio equal to 0.4.

It is prepared and sulphidized in the same way as the catalyst used in the first catalytic zone. In the second catalytic zone, the pressure is kept at 5 MPa, the hourly space velocity is 1 $h^{-1}$ and the total quantity of hydrogen is such that the hydrogen/feed ratio is 500 $Nm^3/h/m^3$.

The temperature conditions used, namely an entry stream temperature equal to 292° C. in the case of the soya oil and 292° C. in the case of the palm oil in the second catalytic zone favour the hydrodenitrogenation kinetics and also permit the deoxygenation reactions to be carried out in the majority of cases. The exit temperature from the second catalytic zone of the hydrotreated effluent is 317° C. for the soya oil, and 320° C. for the palm oil.

The degree of hydrogenation of the unsaturations, the degree of deoxygenation and the nitrogen content of the effluent from the second catalytic zone of the different feeds in the second catalytic zone are given in Table 2. At the end of the hydrotreatment stage a), the hydrogenation of the unsaturations is total, and the nitrogen content is less than 0.4 ppm and the oxygen content is less than 0.2%.

TABLE 2 operating conditions

| | Soya | Palm |
|---|---|---|
| Total pressure (MPa g) | 5 | 5 |
| overall H2/HC ($Nm^3/m^3$) | 1500 | 1500 |
| overall hsv ($h^{-1}$) | 0.6 | 0.6 |
| hsv zone 1 ($h^{-1}$) | 1.6 | 1.6 |
| hsv zone 2 ($h^{-1}$) | 1 | 1 |
| H2/HC zone 1 ($Nm^3/m^3$) | 1000 | 1000 |
| H2/HC zone 2 ($Nm^3/m^3$) | 500 | 500 |
| Overall recycle | 2.95 | 1.25 |
| Entry T zone 1 (° C.) | 200 | 200 |
| Exit T zone 1 (° C.) | 260 | 257 |
| Degree of hydrogenation of the unsaturations zone 1 (mol %) | 76 | 77 |
| Degree of deoxygenation zone 1 (mol %) | 38 | 37 |
| Entry T zone 2 (° C.) | 292 | 292 |
| Exit T zone 2 (° C.) | 317 | 320 |
| Degree of hydrogenation of the unsaturations zone 2 (mol %) | 100 | 100 |
| Degree of deoxygenation zone 2 (mol %) | >97 | >97 |
| Nitrogen content zone 2 (ppm) | <0.4 | <0.4 |

The hydrotreated effluents are then characterized. The yields and the properties of the different cuts are listed in Table 3.

TABLE 3

| Yield (wt. %/fresh feed) | Case of soya oil | Case of palm oil |
|---|---|---|
| Yield $C_1$-$C_7$ cut [wt. %] | 5.1 | 5.2 |
| Yield 150° C. − cut [wt. %] | 0 | 0 |
| Yield 150° C. + cut (kerosene (150-250° C. and gas oil (250° C.+) [wt. %] | 85.4 | 84.3 |

The use of low overall recycle rates is permitted thanks to an advantageous use of the heats of reaction, combined with as low as possible a temperature at the entrance to each catalytic zone. The minimization of the hydraulic flow rate in the first catalytic zone leads to significantly reduced investment costs and operating costs.

Moreover, the minimization of the recycle rate in the unit, leading to a smaller dilution of the nitrogen-containing compounds, combined with a high temperature permitted thanks to the supply of a hot stream at the entrance to the second catalytic zone, leads to higher hydrodenitrogenation kinetics and therefore permits an optimized quantity of catalyst.

The proposed scheme therefore constitutes a flexible and economical method of hydrotreating vegetable oils.

The effluent from the hydrotreatment stage is then separated by means of a hydrogen stripping, in order to recover a gaseous effluent and a hydrotreated liquid effluent of which at least a part is recycled upstream from each catalytic zone of stage a) as explained above.

In the case of the treatment of soya oil, 125 L/h of the hydrotreated liquid effluent is recycled to the first catalytic zone, and 22.5 L/h to the second catalytic zone. All of the non-recycled hydrotreated liquid effluent is passed into a hydroisomerization zone.

In the case of the treatment of palm oil, 50 L/h of the hydrotreated liquid effluent is recycled to the first catalytic zone, and 12.5 L/h to the second catalytic zone. All of the non-recycled hydrotreated liquid effluent is passed into a hydroisomerization zone.

The hydroisomerization catalyst is a catalyst containing a precious metal and a 10 MR one-dimensional ZBM-30 zeolite. This catalyst is obtained according to the procedure described below. The ZBM-30 zeolite is synthesized according to BASF patent EP-A-46504 with the organic structurizing agent triethylenetetramine. The crude ZBM-30 synthetic zeolite is subjected to a calcination at 550° C. under a stream of dry air for 12 hours. The H-ZBM-30 zeolite (acid form) thus obtained has an Si/Al ratio of 45. The zeolite is mixed with a type SB3 alumina gel supplied by the company Condéa-Sasol. The mixed paste is then extruded through a die with a diameter of 1.4 mm. The extrudates thus obtained are calcined at 500° C. for 2 hours under air. The H-ZBM-30 content by weight is 20 wt. %. The supporting extrudates are then subjected to a dry impregnation stage with an aqueous solution of platinum salt $Pt(NH_3)_4^{2+}$, 2OH—, and then undergo a maturation stage in a water soaker for 24 hours at ambient temperature and are then calcined for two hours under dry air in a fluidized bed at 500° C. (temperature rise gradient 5° C./min). The platinum content by weight of the finished catalyst after calcination is 0.48%.

The operating conditions of the hydroisomerization stage are described below:
HSV (volume of feed/volume of catalyst/hour)=1 $h^{-1}$
total operating pressure: 5 MPa
hydrogen/feed ratio: 700 normal liters/liter The temperature is adjusted so as to have a conversion of less than 10 wt. % of the 150° C.$^+$ fraction to 150° C.$^-$ fraction during the hydroisomerization. Before the test, the catalyst undergoes a reduction stage under the following operating conditions:
hydrogen flow rate: 1600 normal liters per hour per liter of catalyst
ambient temperature rise 120° C.: 10° C./min
plateau for one hour at 120° C.
rise from 120° C. to 450° C. at 5° C./min
plateau for two hours at 450° C.
pressure: 0.1 MPa The hydroisomerized effluent is then characterized. The fuel yields and properties are listed in Tables 4, 5 and 6.

TABLE 4 yield of the hydroisomerization section (in wt. % relative to the feed entering the hydroisomerization stage)

| | Yield (wt. %) | |
|---|---|---|
| | Case of soya oil | Case of palm oil |
| $C_1$-$C_4$ cut yield [wt. %] | 1 | 1 |
| 150° C. – cut (naphtha cut) yield [wt. %] | 9.2 | 8.8 |
| 150° C.-250° C. cut (kerosene cut) yield [wt. %] | 31.8 | 37.2 |
| 250° C. + cut (gas oil cut) yield [wt. %] | 58 | 53 |

TABLE 5 characterization of the gas oil base (250° C. + cut)

| | Case of soya oil | Case of palm oil |
|---|---|---|
| Cetane number (ASTMD613) | 80 | 75 |
| Cold filter plugging point (° C.) | −15 | −20 |
| Sulphur (ppm by wt) | 1 | 1 |
| Density (kg/m$^3$) | 790 | 785 |
| Aromatics content (wt. %) | <0.2 | <0.2 |

The density specification is obtained by mixing with a petroleum gas oil of greater density.

TABLE 6 characterization of the kerosene cut (150-250° C. cut)

| | Case of soya oil | Case of palm oil |
|---|---|---|
| Density (kg/m$^3$) | 775 | 770 |
| Smoke point (mm) | 30 | 30 |
| Viscosity (mm$^2$/s) at −20° C. less than 8 | 6 | 5 |

The density, crystals disappearance point and flash point specifications are obtained by mixing with a petroleum kerosene.

The described sequence permits the production, from feeds of renewable origin, of gas oil bases as well as a kerosene cut of excellent quality, in terms of cetane number and low-temperature properties in particular.

Without further elaboration, it is believed that one skilled in the art can, using the preceding description, utilize the present invention to its fullest extent. The preceding preferred specific embodiments are, therefore, to be construed as merely illustrative, and not limitative of the remainder of the disclosure in any way whatsoever.

The entire disclosures of all applications, patents and publications, cited herein and of corresponding French application Ser. No. 09/05.131, filed Oct. 27, 2009, are incorporated by reference herein.

From the foregoing description, one skilled in the art can easily ascertain the essential characteristics of this invention and, without departing from the spirit and scope thereof, can make various changes and modifications of the invention to adapt it to various usages and conditions.

The invention claimed is:

1. A method of treating feeds from renewable sources containing double bonds comprising:
   Providing a hydrotreatment stage a) comprising at least a first catalytic zone serially flow-wise connected to a second catalytic zone;
   Forming an entry stream comprising a hydrogen rich gas, a first portion of a hydrotreated liquid effluent from a separation stage b), and a renewable feed comprises at least one selected from the group consisting of triglycerides, free fatty acids and esters;
   Introducing the entry stream to the first catalytic zone wherein a majority of the double bonds in the renewable feed are hydrogenated at a temperature of 180-210° C. to produce a hydrogenated effluent, and wherein the hydrogenated effluent has a temperature 50-60° C. higher than the entry stream;
   Preheating a second portion of the hydrotreated liquid effluent from separation stage b) to produce a preheated hydrotreated liquid effluent;
   Mixing the preheated hydrotreated liquid effluent with the hydrogenated effluent to produce a second entry stream;
   Introducing the second entry stream to a second catalytic zone at a temperature of 280-320° C. to deoxygenate-hydrodenitrogenate the hydrogenated effluent and to produce an effluent;
   Passing the effluent from the second catalytic zone to the separation stage b) to obtain a gaseous hydrogen-containing effluent and said hydrotreated liquid effluent,
   wherein at least a part of the hydrotreated liquid effluent is recycled as said first and said second portions with an overall recycle rate of greater than 0.5 and less than 3, and wherein the overall recycle rate is defined as the ratio of the mass flow rate of total recycled hydrotreated liquid effluent to the mass flow rate of fresh renewable feed.

2. The method according to claim 1, wherein at least a part of the hydrotreated liquid effluent from separation stage b) is either cooled, or preheated, before being recycled.

3. The method according to claim 1, wherein said second portion of the hydrotreated liquid effluent from the separation stage b) is preheated by passing said second portion into at least one heat exchanger and/or at least one furnace before being recycled.

4. The method according to claim 1, wherein the second entry stream is introduced to the second catalytic zone at a temperature of above 300° C. and up to 320° C.

5. The method according to claim 1, further comprising;
   Heating at least a part of the gaseous hydrogen-containing effluent to produce a heated gaseous hydrogen-containing effluent;
   Mixing the heated gaseous hydrogen-containing effluent with the preheated hydrotreated liquid effluent;
   Purifying a second part of the gaseous hydrogen-containing effluent to produce a hydrogen stream;
   Dividing the purified hydrogen stream;
   Passing a first part of the purified hydrogen stream to the first catalytic zone; and
   Passing a second part of the purified hydrogen stream to the second catalytic zone.

6. The method according to claim 1, wherein at least a part of the hydrotreated liquid effluent is sent to a hydroisomerization stage in the presence of a selective hydroisomerization catalyst.

7. The method according to claim 6, wherein the hydroisomerization catalyst comprises 1) at least one group VIII metal and/or at least one group VIB metal and 2) at least one molecular sieve or an amorphous mineral support.

8. The method according to claim 7, wherein said molecular sieve is a 10 MR one-dimensional ZBM-30 zeolite molecular sieve.

9. The method according to claim 6, wherein the hydroisomerization stage operates at a temperature between 150 and 500° C., at a pressure between 1 MPa and 10 MPa, at a hourly space velocity between $0.1\ h^{-1}$ and $10\ h^{-1}$, and a hydrogen flow rate such that the hydrogen to hydrocarbon volume ratio is between 70 and 1000 $Nm^3/m^3$ of feed.

10. The method according to claim 1, comprising enriching the gaseous-hydrogen-containing effluent from said separation stage b) to produce said hydrogen rich gas which is mixed with said feed and said first portion of a hydrotreated liquid effluent.

11. The method according to claim 1, wherein the feed comprises a palm oil and the overall recycle rate is on the order of 1.25.

12. The method according to claim 4, further comprising:
Heating at least a part of the gaseous hydrogen-containing effluent to produce a heated gaseous hydrogen-containing effluent;
Mixing the heated gaseous hydrogen-containing effluent with the preheated hydrotreated liquid effluent;
Purifying a second part of the gaseous hydrogen-containing effluent to produce a hydrogen stream;
Dividing the purified hydrogen stream;
Passing a first part of the purified hydrogen stream to the first catalytic zone; and
Passing a second part of the purified hydrogen stream to the second catalytic zone.

13. A The method according to claim 1, wherein the first portion of the hydrotreated liquid effluent is mixed with said feed to form said entry stream without contacting a heated wall.

14. A method according to claim 1, wherein said feed comprises soya oil.

15. A method according to claim 1, wherein said feed comprises palm oil.

* * * * *